L. L. RICHARDSON.
VENT VALVE.
APPLICATION FILED JAN. 23, 1913.
1,089,156.
Patented Mar. 3, 1914.
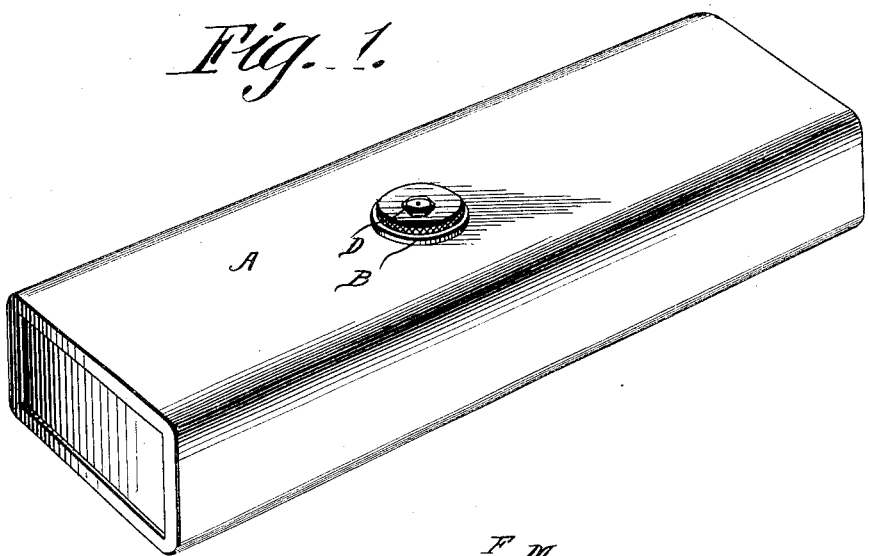
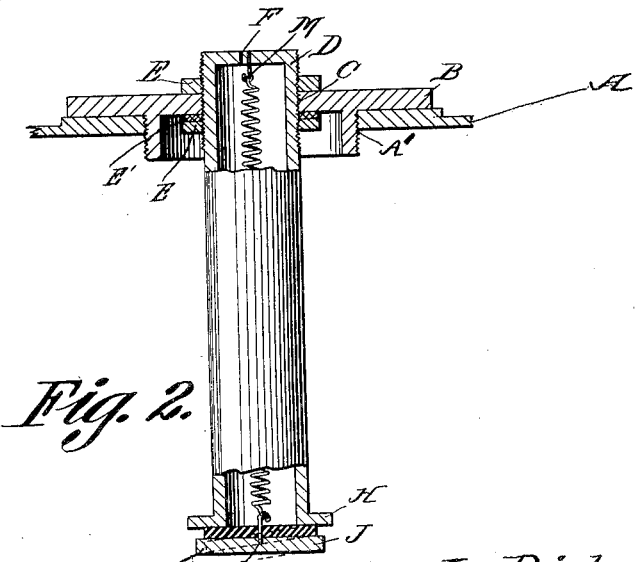
Leslie L. Richardson,
Inventor,

UNITED STATES PATENT OFFICE.

LESLIE L. RICHARDSON, OF BALFOUR, IOWA.

VENT-VALVE.

1,089,156.

Specification of Letters Patent.   Patented Mar. 3, 1914.

Application filed January 23, 1913.   Serial No. 743,771.

*To all whom it may concern:*

Be it known that I, LESLIE L. RICHARDSON, a citizen of the United States, residing at Balfour, in the county of Mills and State of Iowa, have invented certain new and useful Improvements in Vent-Valves, of which the following is a specification.

My invention relates to an improved vent valve, particularly designed for use upon tanks for containing gasolene, the main object being the provision of a device which can be readily attached to the tank and which will operate to vent the tank as well as to prevent the overflow of the liquid, and the escape of vapor.

Another object of my invention is the provision of a device of the character capable of application to gasolene tanks of any character, said device giving vent for the tank and preventing the overflow, and the device being capable of production and application at such small prices as to make its use desirable and further providing a thoroughly efficient and practical improvement for the purpose intended.

To attain the desired objects my invention consists of a vent valve embodying novel features of construction and combination of parts as substantially shown, described and particularly defined by the claim.

In order that the detailed construction and operation of my device may be fully understood and its numerous advantages be appreciated I have illustrated in the accompanying drawings an embodiment of my invention.

Figure 1. represents a perspective view of a gasolene tank equipped with my invention, and Fig. 2. represents a detailed sectional view on an enlarged scale of the device in position for use.

In the drawings: The letter A designates a tank provided with filling opening A', covered by the cap or plug B, and for the purpose of illustration I have shown my device connected to this cap or plug, although I would have it understood that the vent improvement may be used with any character of gasolene tanks and may be connected directly with the wall of the tank in proper position thereon.

The cap or plug B, is provided with a threaded opening C, in which fits the closed threaded end D, of the thimble or sleeve of my vent to secure the thimble or sleeve in place I provide a pair of jam nuts E, and an interposed washer E', the jam nuts and washer being disposed as shown to retain the sleeve or thimble in the cap or well of tank. It will thus be observed that the thimble or sleeve is secured to the tank with its closed upper end extending beyond the tank and provided with a vent opening F, and that its lower open end extends down into the tank and is formed with a flange H, forming a seat for the stopper or closure H', secured upon the cap J, by means of the screw-hook K, and to the hook of the screw and to the screw-hook L, secured in the closed end of the thimble is secured the hook ends M, the cap J being retained in proper position by the coiled spring K'.

From this construction it will be apparent that the vent device is secured either in the wall of the tank or in the cap or plug as may be found necessary and that the spring-actuated valve or closure which covers the open end of the thimble will under proper conditions move and allow the air to pass downward into the tank as well as to prevent any overflow of the liquid to escape, thus providing a device which will automatically give the proper vent to the tank as well as preventing the discharge of any liquid, and the escape of vapor.

It will be understood that the valve is very sensitive and will move readily by reason of its sensitiveness to uncover the opening for the purpose of venting the tank and preventing overflow of the liquid, and the escape of vapor.

It will thus be seen that I provide a device of extremely simple and inexpensive construction which will prove highly desirable for use in connection with gasolene tanks of any character and that the device will prove particularly useful for the use upon tanks of motor-vehicles.

I claim:

The combination with the tank having the threaded filling opening, the cap having the flat broad top provided with a threaded opening and having a depending threaded portion to engage the threaded filling opening of the tank, the thimble having the upper closed end provided with exterior threads to engage the threads of the opening of the cap and having its lower end open and formed with an annular flange, the closure consisting of the plate and pliable disk to engage the open end of the thimble, the adjustable hooks mounted in the closure and closed end of the thimble, the coiled spring having its ends connected to said adjustable hooks in the closure and closed end of the thimble, the coiled spring having its ends connected to said adjustable hooks, and the securing nuts and washer engaging the threaded end of the thimble.

In testimony whereof I affix my signature in presence of two witnesses.

LESLIE L. RICHARDSON.

Witnesses:
C. B. CHRISTY,
J. W. POINTER.

Copies of this patent may be obtained for five cents each, by addressing the "Commissioner of Patents, Washington, D. C."